US011875785B2

(12) United States Patent
Singh Bawa et al.

(10) Patent No.: US 11,875,785 B2
(45) Date of Patent: Jan. 16, 2024

(54) ESTABLISHING USER PERSONA IN A CONVERSATIONAL SYSTEM

(71) Applicant: ACCENTURE GLOBAL SOLUTIONS LIMITED, Dublin (IE)

(72) Inventors: Gurpreet Singh Bawa, Gurgaon (IN); Kaustav Pakira, Mumbai (IN); Souvik Jagdish Chakraborty, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 281 days.

(21) Appl. No.: 17/459,455

(22) Filed: Aug. 27, 2021

(65) Prior Publication Data

US 2023/0062196 A1    Mar. 2, 2023

(51) Int. Cl.
*G10L 15/16* (2006.01)
*G10L 15/08* (2006.01)
(Continued)

(52) U.S. Cl.
CPC .............. *G10L 15/16* (2013.01); *G06N 3/044* (2023.01); *G06N 3/063* (2013.01); *G10L 15/02* (2013.01);
(Continued)

(58) Field of Classification Search
CPC ....... G10L 15/16; G10L 15/02; G10L 15/083; G10L 15/22; G10L 25/18; G10L 25/21;
(Continued)

(56) References Cited

U.S. PATENT DOCUMENTS 6,768,979 B1 * 7/2004 Menendez-Pidal ...... F16J 15/43
704/226
11,137,977 B2 * 10/2021 Weinstein ............... G06F 9/451
(Continued)

OTHER PUBLICATIONS

Gao, Zi-Yuan, and Chia-Ping Chen. "AI Deep Learning with Multiple Labels for Sentiment Classification of Tweets." 2019 IEEE International Symposium on Circuits and Systems (ISCAS). IEEE, 2019. (Year: 2019).*
(Continued)

*Primary Examiner* — Daniel C Washburn
*Assistant Examiner* — Athar N Pasha
(74) *Attorney, Agent, or Firm* — Mannava & Kang, P.C.

(57) ABSTRACT

Systems and methods for establishing user persona from audio interactions are disclosed, including a voice-based conversational AI platform having an acoustic analytical record engine and audio signal codification optimizer. The engine receives an audio sample indicative of voice conversation between an end user and a bot and transforms it into quantifiable and machine-ingestible power spectrum and acoustic indicators that uniquely represent the audio sample in the form of a feature vector. The optimizer ingests and processes the indicators to estimate likelihood of an attribute value representing the audio sample by constructing a convolutional neural network model for each attribute category. The optimizer establishes user persona attribute values across different attribute categories for the audio sample based on the estimated likelihood. Finally, a Textual Latent Value Extractor of the system determines the issue's context window and estimates the statements polarity to provide distinguishable insight in business strategy and development.

16 Claims, 15 Drawing Sheets

(51) Int. Cl.
*G10L 15/02* (2006.01)
*G10L 25/18* (2013.01)
*G10L 25/51* (2013.01)
*G10L 25/30* (2013.01)
*G10L 15/22* (2006.01)
*G06N 3/063* (2023.01)
*G10L 25/21* (2013.01)
*G06N 3/044* (2023.01)

(52) U.S. Cl.
CPC ............ *G10L 15/083* (2013.01); *G10L 15/22* (2013.01); *G10L 25/18* (2013.01); *G10L 25/21* (2013.01); *G10L 25/30* (2013.01); *G10L 25/51* (2013.01); *G10L 2015/227* (2013.01)

(58) Field of Classification Search
CPC ... G10L 25/30; G10L 25/51; G10L 2015/227; G10L 15/1822; G10L 15/26; G10L 17/18; G10L 17/26; G06N 3/044; G06N 3/063; G06N 3/006; G06N 3/0442; G06N 3/0464; G06F 40/30
See application file for complete search history.

(56) References Cited

U.S. PATENT DOCUMENTS

| | | | |
|---|---|---|---|
| 2011/0144987 A1* | 6/2011 | Zhao | G10L 15/20 704/E21.002 |
| 2017/0287356 A1* | 10/2017 | Stephen | G09B 7/06 |
| 2018/0018959 A1* | 1/2018 | Des Jardins | G10L 15/08 |
| 2020/0035224 A1* | 1/2020 | Ward | G10L 15/22 |
| 2022/0059077 A1* | 2/2022 | Thomson | G10L 25/51 |
| 2022/0255885 A1* | 8/2022 | Aharoni | G06N 3/084 |
| 2022/0292346 A1* | 9/2022 | Mimassi | G06F 40/30 |
| 2022/0351715 A1* | 11/2022 | Freed | G10L 13/06 |
| 2022/0392485 A1* | 12/2022 | Brownlee | G10L 25/63 |
| 2023/0005487 A1* | 1/2023 | Emmanuel | H04L 65/403 |
| 2023/0058259 A1* | 2/2023 | Suneja | G06Q 50/265 |

OTHER PUBLICATIONS

Vedula, Nikhita, et al. "Automatic discovery of novel intents & domains from text utterances." arXiv preprint arXiv:2006.01208 (2020). (Year: 2020).*

* cited by examiner

1100

```
┌─────────────────────────────────────────────────────┐
│ RECEIVING AN AUDIO SAMPLE COMPRISING A PLURALITY OF │
│ AUDIO SIGNAL INDICATIVE OF VOICE CONVERSATION       │
│ BETWEEN A USER AND A BOT BY A PROCESSOR FROM A      │
│ DATABASE, A SET OF HUMAN CHAT LOGS                  │
│                       1102                           │
└─────────────────────────────────────────────────────┘
                          ↓
┌─────────────────────────────────────────────────────┐
│ TRANSFORMING THE AUDIO SIGNALS INTO QUANTIFIABLE    │
│ AND MACHINE-INGESTIBLE POWER SPECTRUM INDICATORS    │
│ THAT UNIQUELY REPRESENTS THE AUDIO SAMPLE IN THE    │
│ FROM OF FEATURE VECTOR                              │
│                       1104                           │
└─────────────────────────────────────────────────────┘
                          ↓
┌─────────────────────────────────────────────────────┐
│ INGESTING AND PROCESSING THE POWER SPECTRUM         │
│ INDICATORS AND THE ACOUSTIC INDICATORS TO ESTIMATE  │
│ LIKELIHOOD OF AN ATTRIBUTE VALVE REPRESENTING THE   │
│ AUDIO SAMPLE BY CONSTRUCTING A NEURAL NETWORK       │
│ MODEL FOR EACH ATTRIBUTE CATEGORY                   │
│                       1106                           │
└─────────────────────────────────────────────────────┘
                          ↓
┌─────────────────────────────────────────────────────┐
│ ESTABLISHING USER PERSONA ATTRIBUTE VALUES ACROSS   │
│ ONE OR MORE ATTRIBUTE CATEGORIES FOR THE RECEIVED   │
│ AUDIO SAMPLE BASED ON THE ESTIMATED LIKELIHOOD      │
│ DETERMINING THE ISSUE'S CONTEXT WINDOW AND          │
│ ESTIMATING THE STATEMENTS POLARITY TO PROVIDE       │
│ DISTINGUISHABLE INSIGHT IN BUSINESS STRATEGY AND    │
│ DEVELOPMENT                                         │
│                       1108                           │
└─────────────────────────────────────────────────────┘
```

FIG. 11

ESTABLISHING USER PERSONA IN A CONVERSATIONAL SYSTEM

BACKGROUND

Businesses and organizations are moving towards automating conversations by using techniques such as, for example, Artificial Intelligence (AI) based bats and assistants. While a major share of these AI assistants are text based, the emergence of voice-based assistants too is on the rise. The movement towards an audio/voice-based system is preferable because it is much faster and easier for the end-user to use rather than writing/typing. While audio/voice-based systems are beneficial over the text based systems, they pose a major challenge in that there is no information present about the end-user involved in the interaction. The text based systems include a chat user interface (UI) on which end-users sign in to converse with the hot. The sign-in option captures various information about the end-user and helps the system in mining that information and use it in formulating an interaction strategy with the end-user. On the other hand, voice based systems do not require login to a portal, or online platform, where fields such as name, age and gender are input for signing up. This lack of demographic information may hamper the ability of voice-based customer service systems to provide efficient customer service and resolution of customer issues. For this reason, many organizations continue to prefer text based systems over the voice-based systems despite preference of the end users for the voice-based systems.

There is, therefore, a need in the art to provide an improved conversational system and method thereof that may improve conventional conversational systems by establishing end user persona based on the conversation between the system and the end user.

SUMMARY

An embodiment of present disclosure relates to a system including a voice-based conversational artificial intelligence (AI) platform having an acoustic analytical record engine which may be operatively coupled with a processor. The processor may cause the engine to receive an audio sample including a plurality of audio signals. The audio signals may be indicative of voice conversation between a user and a bot. The processor may cause the engine to transform the audio signals into quantifiable and machine-ingestible power spectrum indicators and acoustic indicators that uniquely represent the audio sample in the form of a feature vector. The AI platform may also include an audio signal codification optimizer coupled with the processor. The processor may cause the optimizer to ingest and process the power spectrum indicators and the acoustic indicators to estimate likelihood of an attribute value representing the audio sample by constructing a convolutional neural network model for each attribute category. The processor may also cause the optimizer to establish user persona attribute values across one or more attribute categories for the received audio sample based on the estimated likelihood.

Another embodiment of the present disclosure relates to a method for establishing user persona from audio interactions. The method may include the step of receiving an audio sample comprising a plurality of audio signals indicative of voice conversation between a user and a bat. The method may include transforming the audio signals into quantifiable and machine-ingestible power spectrum indicators and acoustic indicators. The indicators uniquely represent the audio sample in the form of a feature vector. The method may include the steps of ingesting and processing the power spectrum indicators and the acoustic indicators to estimate likelihood of an attribute value representing the audio sample by constructing a convolutional neural network model for each attribute category, and establishing user persona attribute values across one or more attribute categories for the received audio sample based on the estimated likelihood.

Yet another embodiment of the present disclosure relates to a non-transitory computer readable medium comprising machine executable instructions that may be executable by a processor to an audio sample comprising a plurality of audio signals indicative of voice conversation between a user and a bat. The processor may be configured to transform the audio signals into quantifiable and machine-ingestible power spectrum indicators and acoustic indicators that uniquely represent the audio sample in the form of a feature vector. The processor may ingest and process the power spectrum indicators and the acoustic indicators to estimate likelihood of an attribute value representing the audio sample by constructing a convolutional neural network model for each attribute category. The processor may establish user persona attribute values across one or more attribute categories for the received audio sample based on the estimated likelihood.

BRIEF DESCRIPTION OF DRAWINGS

FIG. 11 illustrates an exemplary method flow diagram for the disclosed method for establishing user persona from audio interactions, according to an embodiment of the present disclosure.

DETAILED DESCRIPTION

Figure 1:
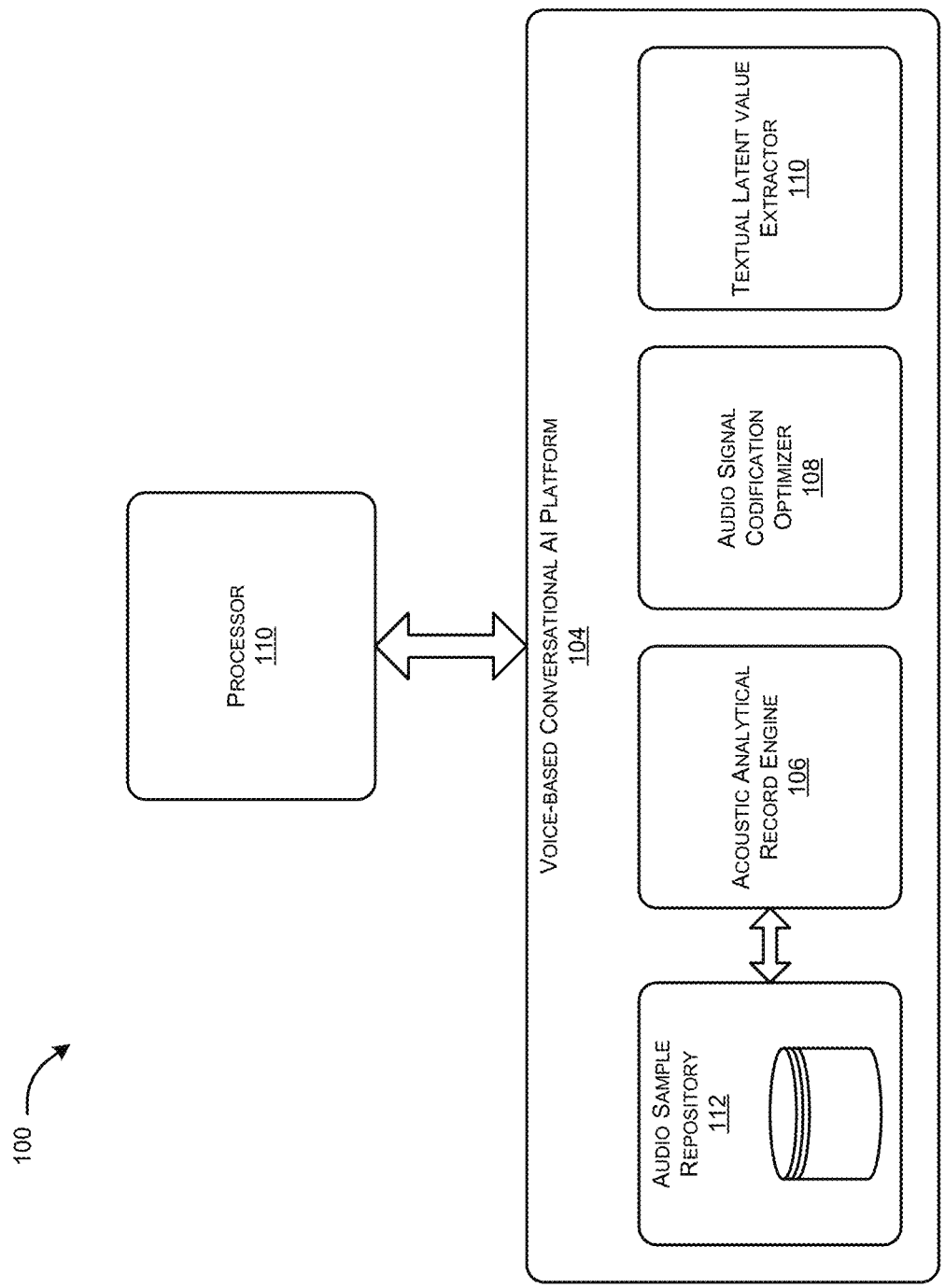
FIG. 1 illustrates an exemplary system diagram for the disclosed system for establishing user persona from audio interactions, according to an embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe herein provide a solution, in the form of a system and a method, for establishing user persona from audio interactions. Specifically, the embodiments described herein provide a system and a method that addresses the issue of how the audio signals from an end-users can be utilized to derive and establish a persona around them, such as a likelihood of what gender or age group or dialect can be attributed to the end user. The embodiments describes herein provide a system and a method that aids and optimizes in quantifying the sound/audio signal from audio interactions between the end user and a hot, and in establishing facets that eventually help in attribution of end-user persona such as gender, age, accent etc.

Additionally, the audio signals may be converted to a textual format and pre-trained models such as text analytics models may be brought into the loop to establish associated polarities from the interaction coupled with the latent intents. Thus, the proposed system and method help to bridge gap between the raw audio speech signals and the highly insightful text analytics, wherein the useful attributes such as likelihood of gender, age group, geographical accent may be mined from the audio signals and carried forward to the text analytics component.

The system may include a voice-based conversational artificial intelligence (AI) platform. The AI platform can include an acoustic analytical record engine which may be operatively coupled with a processor. The processor may cause the engine to receive an audio sample including a plurality of audio signals. The audio signals may be indicative of voice conversation between a user and a hot. The processor may cause the engine to transform the audio signals into quantifiable and machine-ingestible power spectrum indicators and acoustic indicators that uniquely represent the audio sample in the form of a feature vector. The AI platform may also include an audio signal codification optimizer coupled with the processor. The processor may cause the optimizer to ingest and process the power spectrum indicators and the acoustic indicators to estimate likelihood of an attribute value representing the audio sample by constructing a customized sequential CNN architecture for each attribute category. The processor may also cause the optimizer to establish user persona attribute values across one or more attribute categories for the received audio sample based on the estimated likelihood.

Referring to FIG. 1, where a block diagram or the system 100 for establishing user persona from audio interactions is disclosed, the system 100 may be implemented by way of a single device or a combination of multiple devices that may be operatively connected or networked together. The system 100 may be implemented in hardware or a suitable combination of hardware and software. The system 100 includes at least one processor 102. The processor 102 may be operatively coupled with a voice-based conversational artificial intelligence (AI) platform 104. The AI platform may include an acoustic analytical record engine 106, an audio signal codification optimizer 108, and a textual latent value extractor 110. The processor 102 may be operatively coupled with the acoustic analytical record engine 106, the audio signal codification optimizer 108 and the textual latent value extractor 110.

The system 100 may be a hardware device including the processor 102 executing machine readable program instructions to establish user persona from audio interactions. Execution of the machine readable program instructions by the processor 102 may enable the proposed system to establishing user persona from audio interactions. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions from a memory operationally coupled with system 100 for performing tasks such as data processing, input/output processing, feature extraction, and/or any other functions. Any reference to a task in the present disclosure may refer to an operation being, or that may be, performed on data.

The acoustic analytical record engine 106 may receive one or more audio samples, where each sample may include a plurality of audio signals. The plurality of audio signals may be indicative of voice conversation between a user and a bot. The acoustic analytical record engine 106 may transform the audio signals into quantifiable and machine-ingestible power spectrum indicators and acoustic indicators. The power spectrum indicators and acoustic indicators may uniquely represent the audio sample in the form of a feature vector. The acoustic analytical record engine 106 may also be associated with an audio samples repository/database 112. The repository 112 may maintain one or more records of docketing past audio samples along with mapped user persona attribute values across one or more attribute categories.

The audio signal codification optimizer 108 may ingest and process the power spectrum indicators and the acoustic indicators to estimate likelihood of an attribute value representing the audio sample by constructing a customized sequential CNN architecture for each attribute category. The audio signal codification optimizer 108 may establish user persona attribute values across one or more attribute categories for the received audio sample based on the estimated likelihood.

The textual latent value extractor 110 may generate textual transcript based on the audio sample and process the transcript through a machine learning engine such as hybrid deep learning engine. The machine learning engine may process textual content in the transcript and evaluate interactions in the content so as to estimate associated polarities coupled with latent intents.

Figure 2:
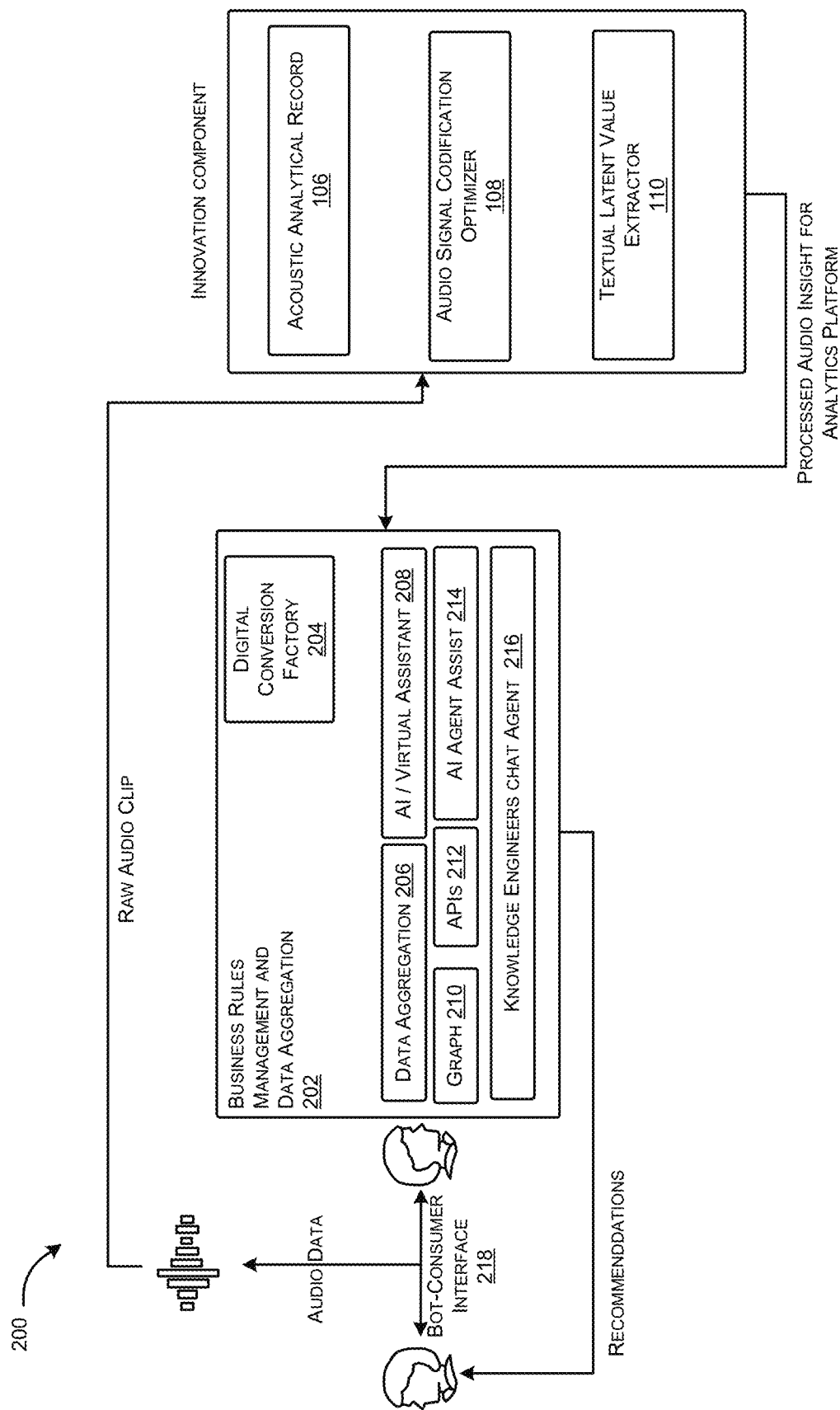
FIG. 2 illustrates an exemplary block diagram of the voice-based conversational artificial intelligence platform of FIG. 1, according to an embodiment of the present disclosure.

FIG. 2 illustrates an exemplary diagram of a voice-based conversational artificial intelligence platform 200 of FIG. 1. The voice-based conversational artificial intelligence platform 200 may help to bridge the gap between raw audio speech signals and highly insightful text analytics. The platform may be configured to receive raw audio clips from a conversational system which may be configured to enable engagement of an end-user with a bot using a voice-based communication bot-consumer interface 218. The platform may be configured to utilize the raw audio data to establish a persona of the end-user. Useful attributes such as likelihood of gender, age group, geographical accent may be mined from the received audio signals with the help of the acoustic analytical record engine 106 and the audio signal codification optimizer 108 before audio information obtained from the audio signals is carried forward to the textual latent value extractor 110. The platform may facilitate in obtaining a unique acoustic signature of the end-user (which can be later used to uniquely identify the end-user). The platform also facilitates to fill in the blanks on demographics of the end-user by predicting various persona attributes from the received audio.

Various insights may be mined from the received audio by the use of the acoustic analytical record engine 106, the audio signal codification optimizer 108, and the textual latent value extractor 110. The insights may be provided as an input to an analytics platform such as business rules management and data aggregation platform 202 to utilize the insights to perform various functions, such as data aggregation 206, knowledge processing, graph-based analysis 210, artificial intelligence analytics, and the like. The business rules management and data aggregation platform 202 may include digital conversion factory 204, AI/virtual assistant 208, APIs 212, AI agent 214, and knowledge engineers chat agent 216. Further, the analytics platform may be configured to generate one or more recommendations or perform one or more actions. The generated recommendations may be provided to the user and/or other systems or components internal or external to the AI platform. Similarly, the analytics platform may perform the one or more actions in association with the other systems or components internal or external to the AI platform.

Figure 3:
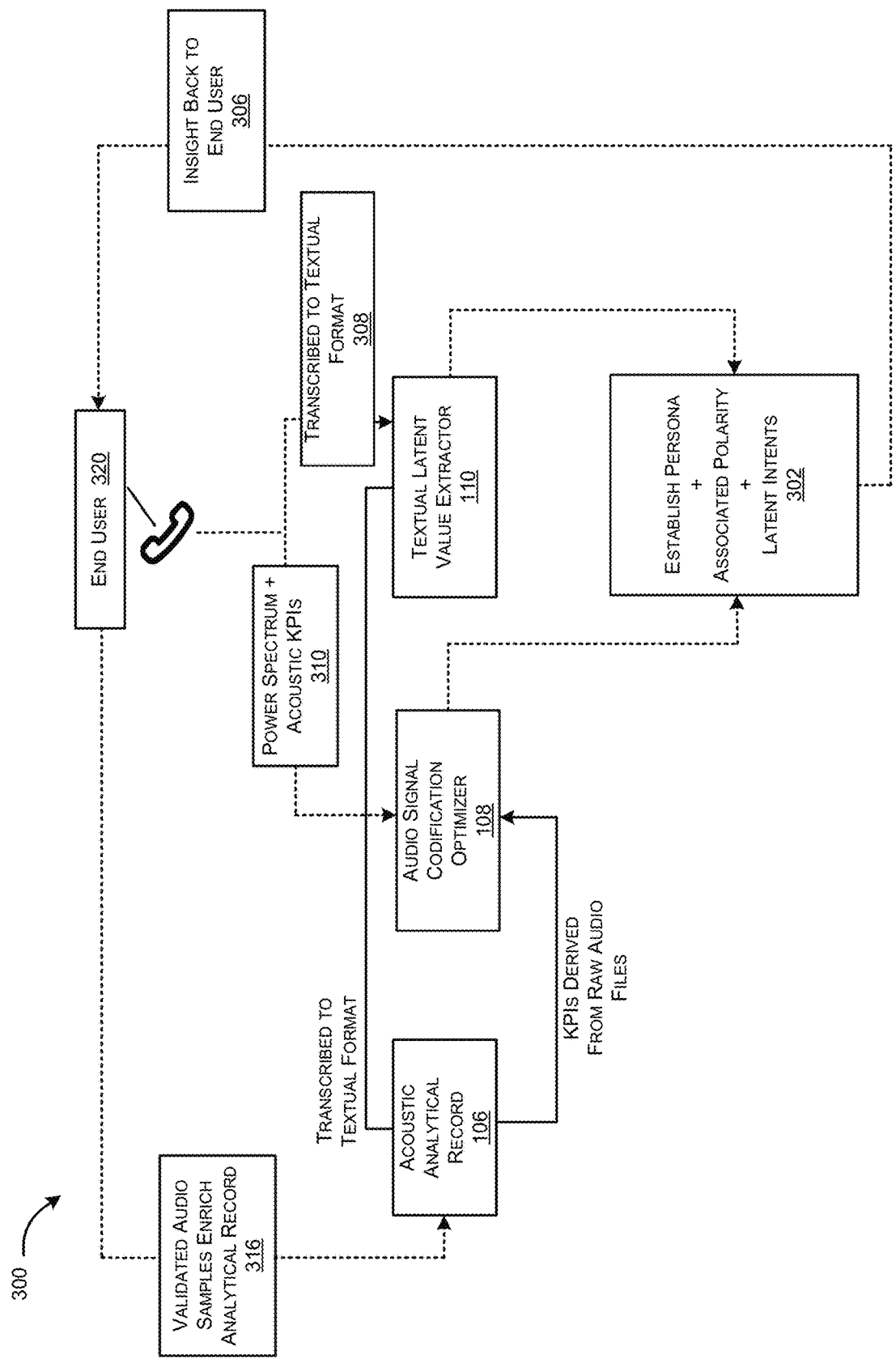
FIG. 3 illustrates an exemplary block diagram showing an overall component process flow of the voice-based conversational artificial intelligence platform of FIG. 1, according to an embodiment of the present disclosure.

FIG. 3 illustrates an exemplary diagram showing an overall component process flow 300 of the voice-based conversational artificial intelligence platform 200 of FIG. 1. The acoustic analytical record engine 106 receives validated audio samples 316 from end user(s) 320 and enriches audio samples repository 112 (not shown) with validated audio samples 316. The acoustic analytical record engine 106 maintains records in the repository 112 along with corresponding tags or categories obtained from the audio signal codification optimizer 108. The acoustic analytical record engine 106 may be configured to quantify the received audio inputs from the end user(s) and derive key performance indicators (KPI) from the audio inputs. The KPIs may be in a machine-ingestible form. The acoustic analytical record engine 106 may also be configured to transform or transcribe the audio inputs into a textual format 308 which may be a transcript of the conversation between the end user and the bot. The KPIs derived from raw audio may be provided to the audio signal codification optimizer 108 and the transcript or textual data obtained from raw audio may be provided to the textual latent value extractor 110 for further processing.

In an exemplary embodiment, the audio signals obtained from the end user's conversation with the bot are converted to power spectrum KPIs and acoustic KPIs 310 by the acoustic analytical record engine 106 and the KPIs are fed to the audio signal codification optimizer 108 as input. The power spectrum KPIs and acoustic KPIs may be treated by the audio signal codification optimizer 108 to establish one or more user persona attributes. The textual data obtained from raw audio by the acoustic analytical record engine 106 may be machine ingestible. The textual data may be processed by the textual latent value extractor 110 to establish one or more polarities and one or more latent intents. Therefore, based on the processing of the acoustic analytical record engine 106, the audio signal codification optimizer 108, and the textual latent value extractor 110, one or more persona attributes, one or more polarities, and/or one or more latent intents 302 may be established. The one or more persona attributes, one or more polarities, and/or one or more latent intents may be collectively or individually referred to as insights.

In another exemplary embodiment, the process flow 300 may allow sharing of insights with the end user 306. Additionally, or alternatively, the insights may be provided to an analytics system, recommendation system, or any other external system. The insights may also be used as feedback to at least one of the acoustic analytical record engine 106, the audio signal codification optimizer 108, and the textual latent value extractor 110. The insights may also be used to validate or enrich the data stored in the repository 112.

Figure 4:
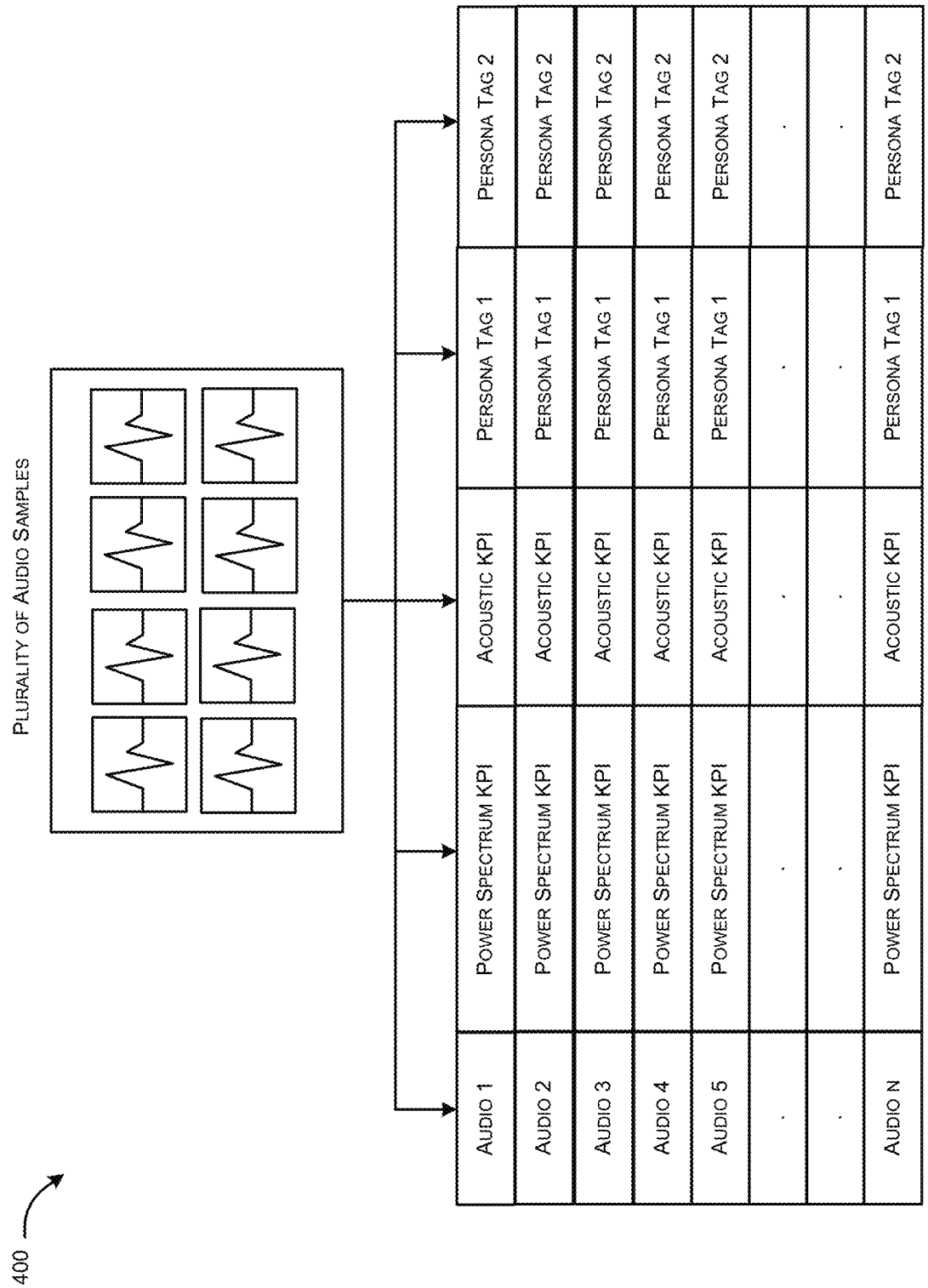
FIG. 4 illustrates an exemplary diagram showing records of audio samples maintained in an audio samples repository associated with the acoustic analytical record engine of the system of FIG. 1, according to an embodiment of the present disclosure.
Figure 5A:
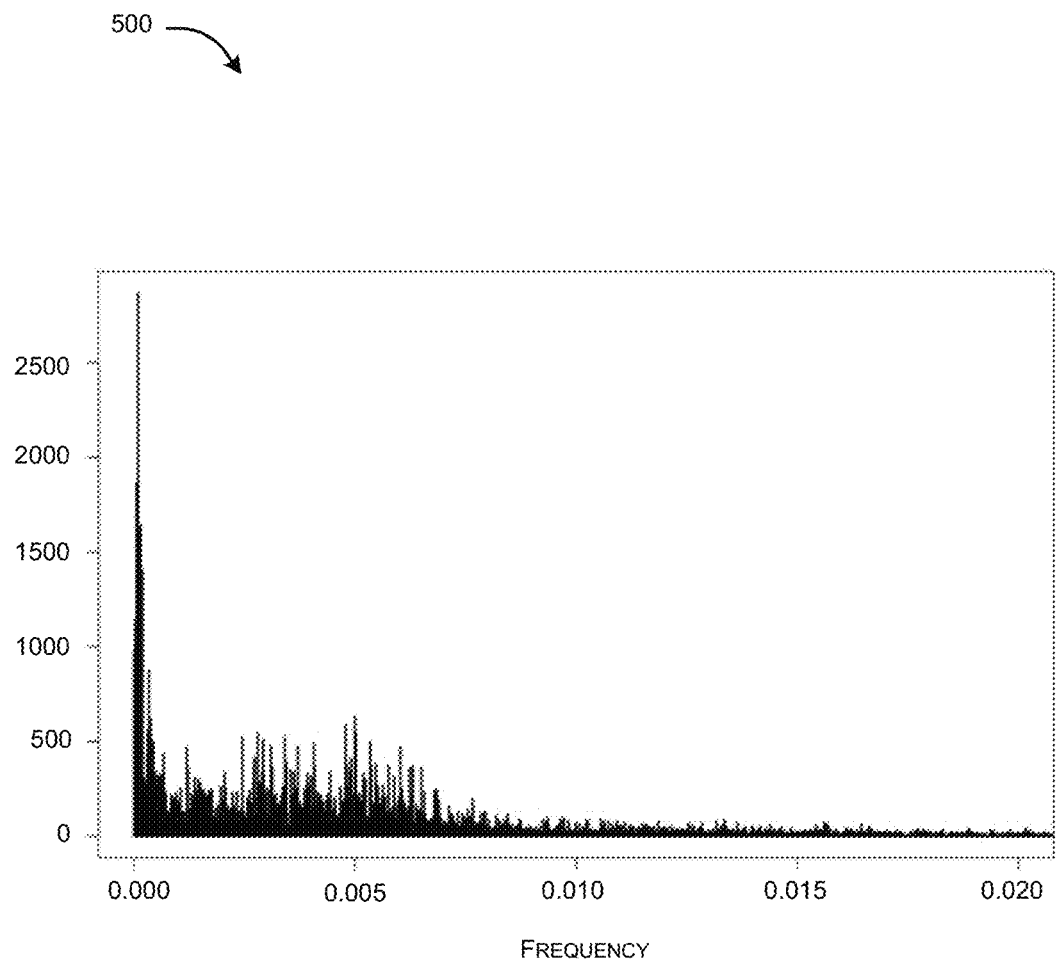
FIGS. 5A-5G illustrate an exemplary diagram showing characteristics of audio signals received for quantification by the acoustic analytical record engine of the system of FIG. 1, according to an embodiment of the present disclosure.
Figure 5B:
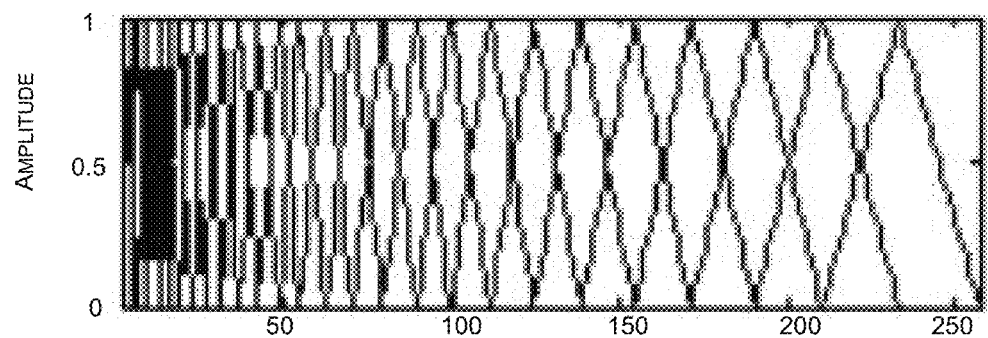
Figure 5C:
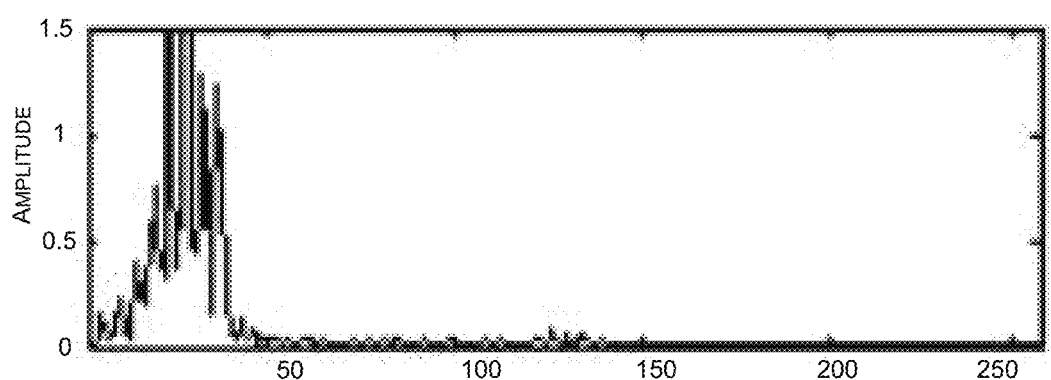
Figure 5D:
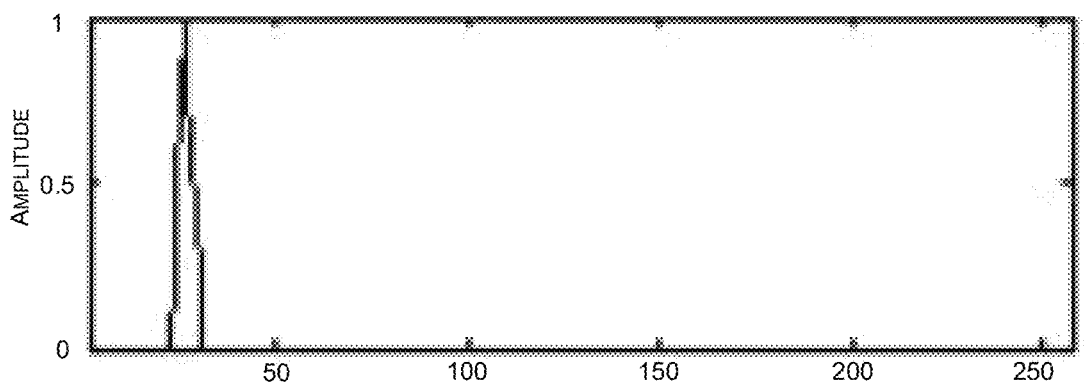
Figure 5E:
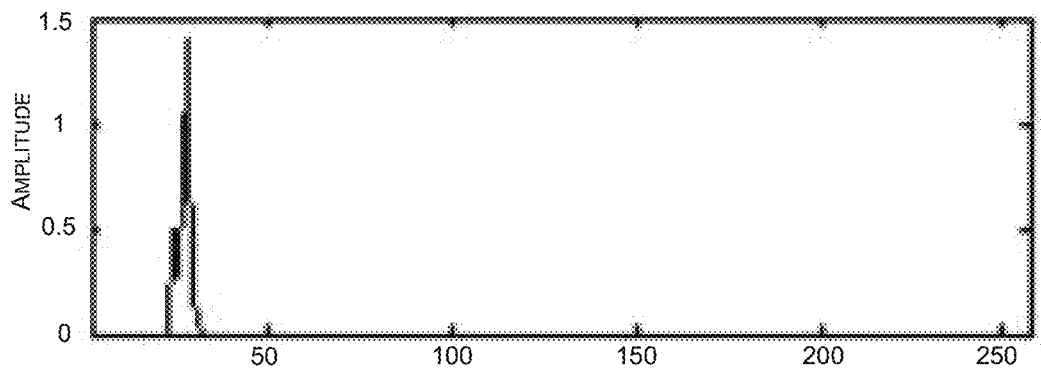
Figure 5F:
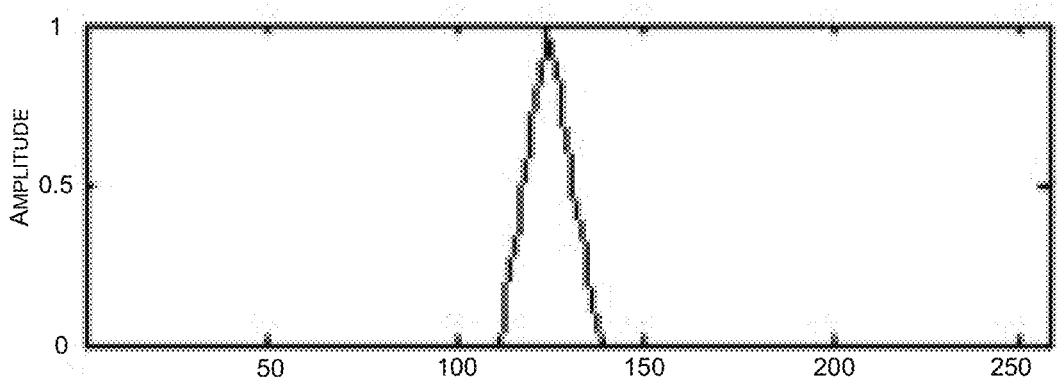
Figure 5G:
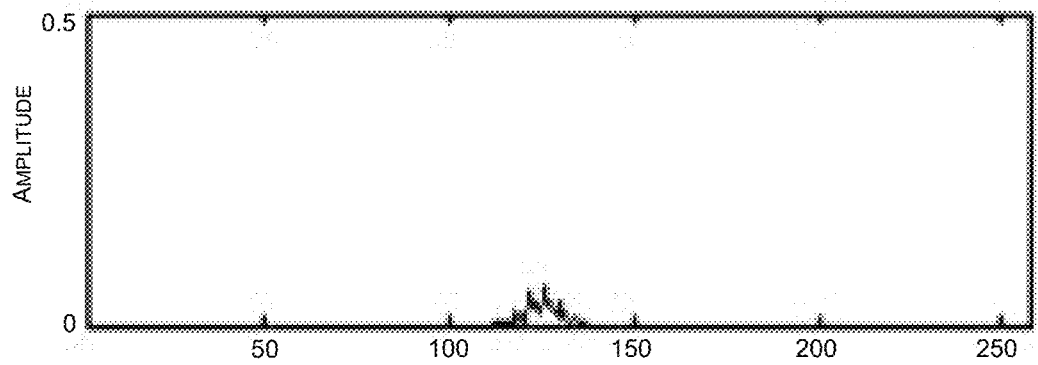

FIG. 4 illustrates an exemplary record of audio samples 400 maintained in an audio samples repository associated with an acoustic analytical record engine of the system of FIG. 1. The acoustic analytical record engine 106 may be configured to maintain docketed audio clips of human speech which may include one or more tags or categories as per the requirement on attributes of persona the system would be configured to establish. Each speech sample may act as an entry into the next two components, though not in its raw format. Each audio signal may require a transformation which quantifies the audio signal and makes machine ingestible. The transformation may produce acoustic KPIs and power spectrum KPIs that describe the audio signal effectively. The form/structure of the user's vocal tract may establish itself in an envelope of the short time power spectrum which may be accurately depicted with the help of the power spectrum coefficients. Apart from the power spectrum KPIs, few more additional acoustic features too may be extracted based on audio signal attributes, such as but not limited to frequency, phase, amplitude, and the like. The analytical record which initially was composed of speech samples and corresponding attribute tags may be converted to a quantifiable set of features that can describe audio samples in a machine ingestible format.

In an exemplary embodiment, new audio samples from future interactions too may be docketed back into the records based at least on one or more feedbacks from the end-user. If a prediction made by the audio signal codification optimizer 108 has a high likelihood probability and is also acknowledged by the end-user feedback, the audio signal may be re-incorporated back into the acoustic analytical record and stored in the repository 112, thereby enriching a training dataset. The records in the repository 112 may be used to train one or more learning models associated with the audio signal codification optimizer 108 and/or the textual latent value extractor 110.

FIGS. 5A-5G illustrate an exemplary characteristics 500 of audio signals received for quantification by the acoustic analytical record engine of the system of FIG. 1. The raw audio signals may fluctuate continuously. With the assumption that audio the signal does not alter in a statistically significant manner, the audio signal may be divided into 20-40 ms frames, for example. A shorter frame length than 20-40 ms may not produce sufficient samples required to obtain consistent spectral estimates. Also, in case the frame is lengthier, there may be a possibility that the signal may change across the frames a little more than required. Next, the frame specific power spectrum may be calculated using a periodogram. The estimates from the power spectrum of the periodogram may include a substantial amount of information which may not hold much value. This phenomenon may become much more noticeable with increase in frequencies in the signal. Thus, bands of the periodogram are considered for analysis and the bands may then be added since it would then reflect the amount of energy existing in the different frequency bands. Hence, a separate scaling filter bank may be used with variable or diverging width. The filter bank specific summed energies may go through a logarithmic transformation for having effective normalization. Finally, a cosine transformation may be performed after the logarithmic transformation to de-correlate the overlapping energies that may get captured in the filter bank. Hence, the resulting coefficients then can be used as a unique signature for the specific audio signal.

In an exemplary embodiment, quantification of audio signals may be done by Linear Prediction Coefficients (LPC) and Discrete Wavelet Transformation (DWT). LPC may be a prevalent method when the amplitude may be out of an appropriate range. The transformation may primarily concentrate on performing a linear transformation which may lose majority of the information in the audio spectrum. The quality of the audio signal may also be lowered due to the nature of the transformation. On the other hand, DWT may have a few drawbacks, one of which may be that the transformation may have poor sensitivity. DWT may not be extremely sensitive to changes in the signal which may frequently result in data loss. In contrast, in the proposed system, overlapping windows may be used to ensure that no signal may be lost throughout the transformation process. Then, a cosine transformation may be performed to the data to ensure that the signals of two windows are uncorrelated, resulting in the capture of unique features from each window. The proposed system may use a logarithmic transformation which can approximate human spectrum bands more accurately. Additionally, normalization and de-correlation may help to deal with additive noise in the signal.

Figure 6:
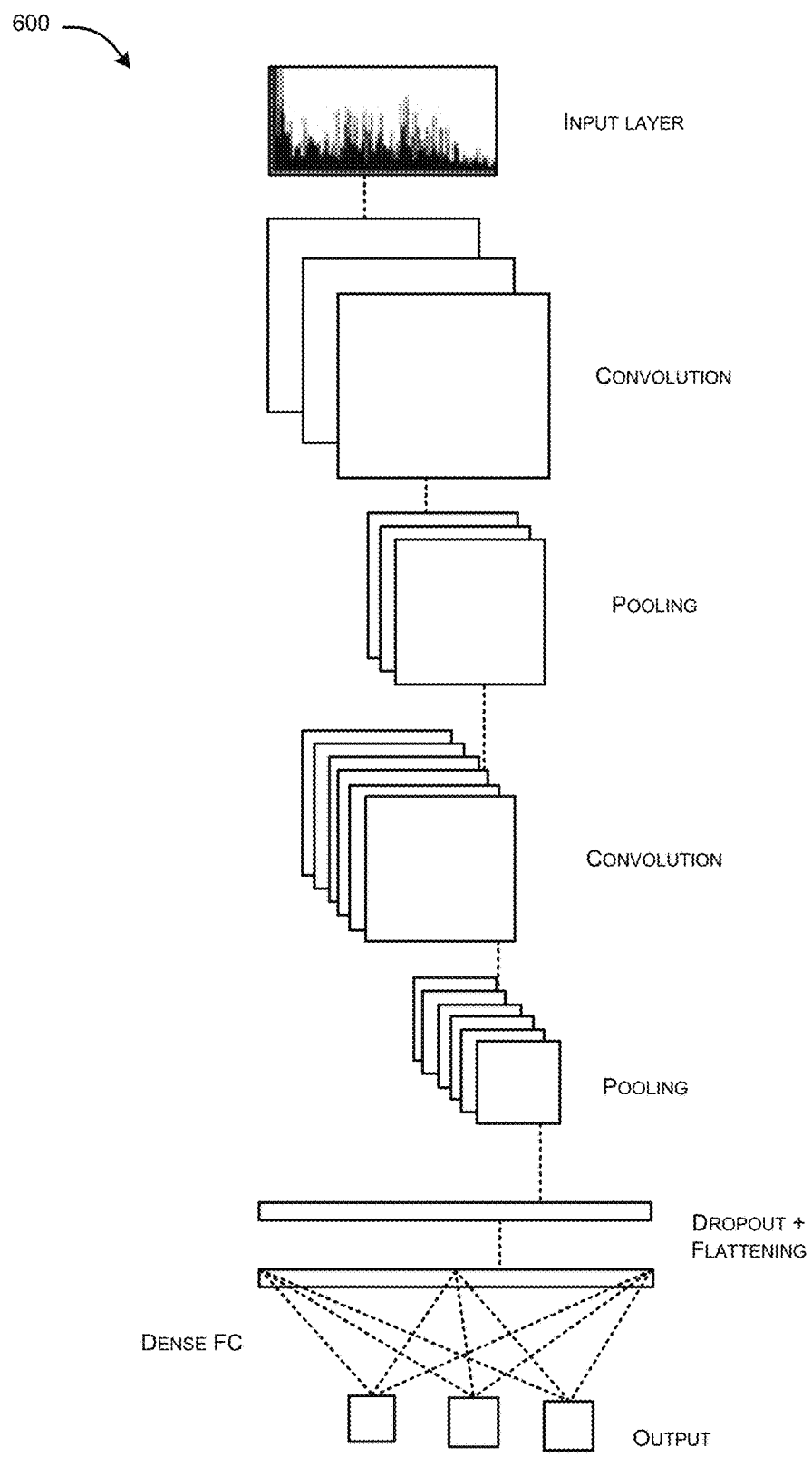
FIG. 6 illustrates an exemplary diagram depicting a codification process of an audio signal codification optimizer of the system of FIG. 1, according to an embodiment of the present disclosure.

FIG. 6 illustrates an exemplary diagram of codification process 600 of an audio signal codification optimizer 108 of the system of FIG. 1, and. helps describe the speech sample in a machine ingestible format. The audio signal codification optimizer 108 may be configured to ingest the quantifiable feature KPIs from the acoustic analytical record engine 106. Audio signal codification may involve three separate phases, namely signal pre-processing, feature engineering and likelihood estimation. The first two phases may be taken care of by the acoustic analytical record engine 106. One of the primary objectives of audio signal codification optimizer 108 may be to optimize the codification process of any speech sample against the prospective persona attributes in the records produced by the acoustic analytical record engine 106 by estimating one or more likelihood scores for each tag or category. One or more convolutional neural network models, such as but not limited to a feedforward artificial neural networks may be constructed for each persona attribute which may ingest the one or more quantifiable features or CPIs obtained from the previous component, i.e., the acoustic analytical record engine 106. The audio signal codification optimizer 108 may be configured to optimize estimated weights of the one or more convolutional neural network models across the different layers of each model. Once stable optimized convolutional neural network model is in place, any speech sample can be passed through the network model by deconstructing it to the quantifiable features. The convolutional neural network models may then estimate likelihood for the available tags or categories within one or more persona attributes and predict the one with maximum likelihood.

In an exemplary embodiment, audio signal codification optimizer 108 may use the one or more network models, where the one or more models may include one or more arrangements of one or more convolutional and one or more pooling layers as illustrated in FIG. 6. For example, a convolution layer with kernel size 3×3 may be followed by a max pooling layer with pool size 2×2. The one or more arrangements of the one or more convolution layers and the one or more pooling layers may be repeated one or more times where size of the layers may be same or different. The one or more models may also include one or more dropout layers, one or more flattening layers, and/or two or more dense layered neural networks.

Figure 7:
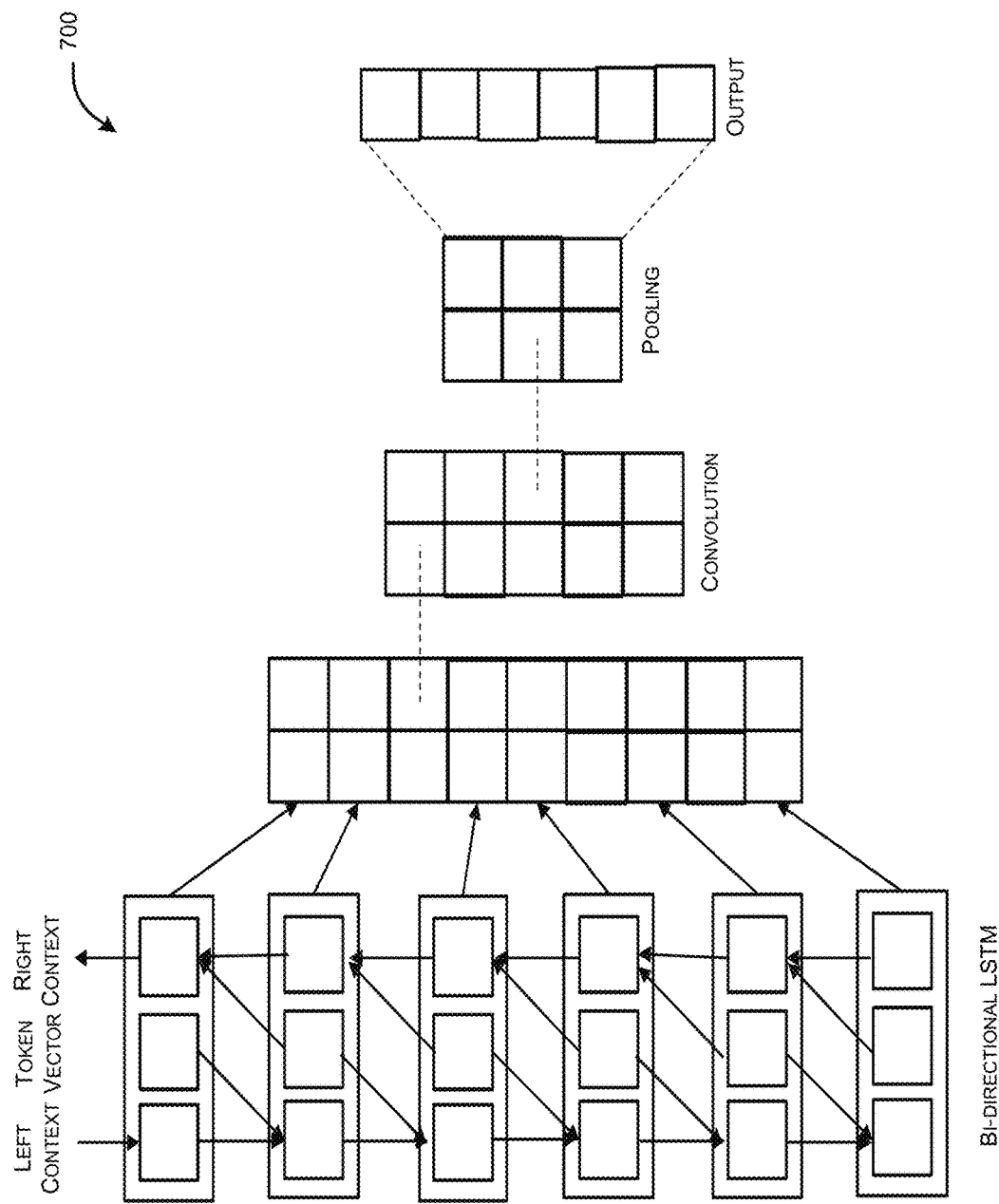
FIG. 7 illustrates an exemplary diagram of a machine learning model used by a textual latent value extractor of the system of FIG. 1, according to an embodiment of the present disclosure.

In another exemplary embodiment, a sequential convolutional neural network (CNN) architecture may be used by the audio signal codification optimizer 108 as illustrated in FIG. 6. The audio signal codification optimizer 108 may use the one or more models to capture relational data that exists across all the KPIs. The sequential convolutional neural network architecture may use two-step convolutional and pooling strategy to capture non-linear dependent relationship present across the numerical data produced by the acoustic analytical record engine 106. A hyper parameter tuning or optimization may be used to obtain best-fitting model architecture for the data. For classification, a fully connected neural network may be utilized in conjunction with the CNN at the model's final layer. The use of CNN may help with channel mismatched train-test conditions, provide robustness under presence of noise, modulated audio codification, and low footprint in terms of memory and resource utilization. The CNN may be a better feature extractor and constructor compared to other artificial neural network architectures which are generally used in similar scenarios, FIG. 7 illustrates an exemplary diagram of a machine learning model 700 used by a textual latent value extractor of the system of FIG. 1. Apart from the codification exercise performed by the audio signal codification optimizer 108, further value can be extracted from the speech samples. The textual latent value extractor 110 may be configured to process the speech samples after the speech samples are converted to textual format by the acoustic analytical record engine 106. The textual latent value extractor 110 may pass the textual data obtained from the speech signals to a machine learning model, such as a hybrid deep learning model. The machine learning model may be configured to consume the textual content and extract one or more attributes, such as associated polarities from the interaction coupled with one or more latent intents. For estimating the associated polarities, a bi-directional LSTM Neural Network may be used with an extension of considering the associated contextual target. The token vector representations obtained from the textual data may be fed into a sentence-level bi-directional LSTM neural network, whose final states may be merged with the target contextual vector and further fed into another bidirectional review-level LSTM resulting in the polarity probabilities. Further, in order to establish the one or more intents, an extension may be made of the word vector representations on top of the token concurrent probabilistic distributions. The machine learning model may be configured to essentially model the latent probabilistic distribution of collection of concurrent contextual tokens, aligning to the underlying intents in question.

In an exemplary embodiment, estimation of the associated polarities may involve a couple of tasks. The first may be to set up a representation for a contextual target, such as learning a target contextual embedding, which may be like having a vector representation. The next may be to identify the primary context tokens for the specified target. For example, in the sentence "the screen of the phone is bigger, but the display is unclear"—"bigger" may be the contextual target for "screen and unclear" for "display". To tackle this, a bi-directional LSTM neural network may be used for context dependent polarity estimation since the bi-directional LSTM neural network may capture the relations both within and between sentences. The solitary dependency on the sentences and their structures within the converted text may be of utmost usefulness since it may take care of all possible variations in the conversations. The token vector representations may be fed into a sentence-level bi-directional LSTM neural network, whose final states may be merged with the target contextual vector and further fed into another bidirectional review-level LSTM resulting in the polarity probabilities.

Figure 8:
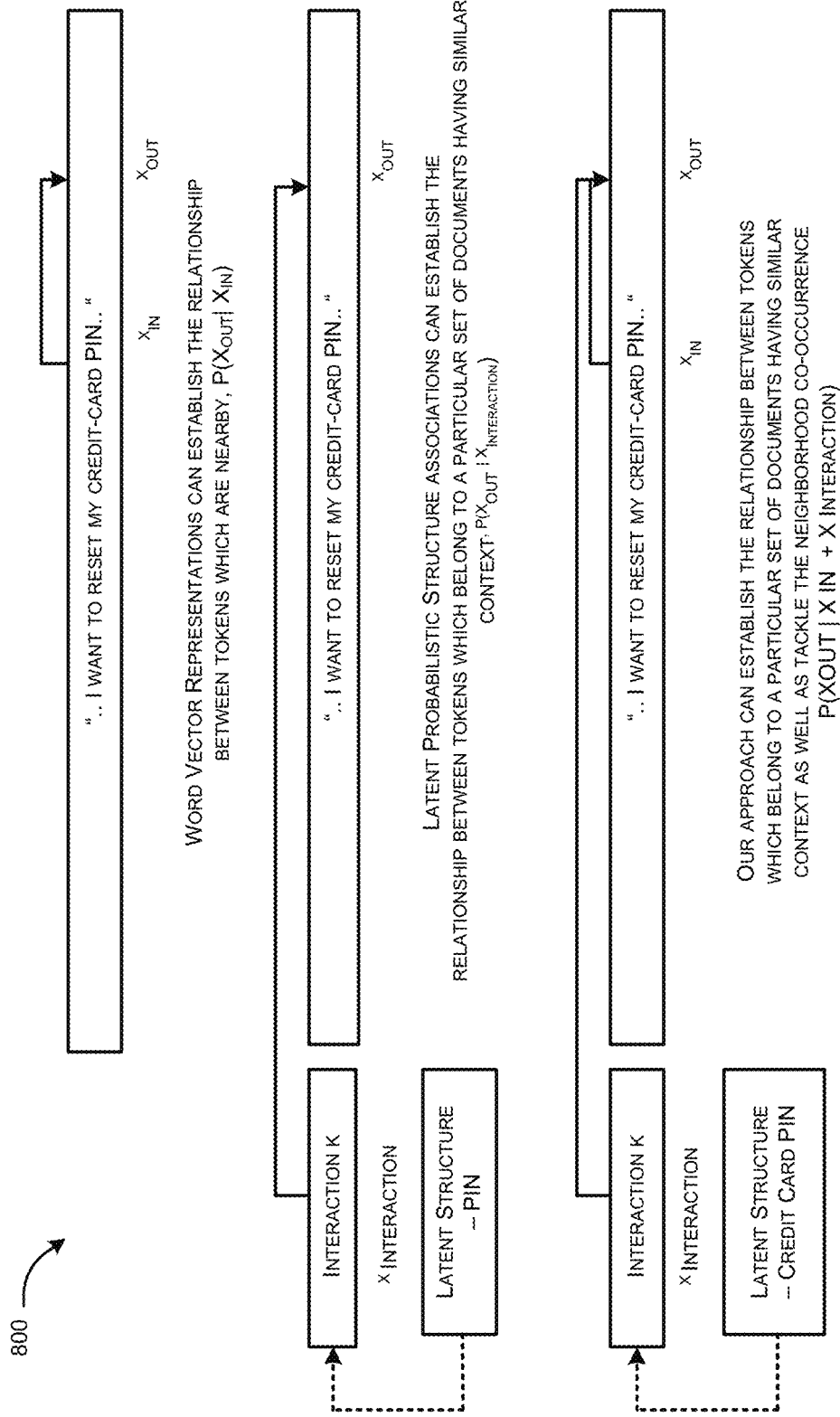
FIG. 8 illustrates an exemplary diagram depicting a process of finding latent information by the textual latent value extractor of the system of FIG. 1, according to an embodiment of the present disclosure.

FIG. 8 illustrates an exemplary diagram depicting a process 800 of finding latent information by the textual latent value extractor of the system of FIG. 1 in an exemplary embodiment, the textual latent value extractor 110 may utilize a model which can learn dense word vectors jointly with the probabilistic latent interaction-level mixtures of latent intents. One of the objects may be to obtain the contribution of each of the underlying intents on the interactions based on the granular token vector representations. For example, while a simple probabilistic latent intent model may be able to establish a latent intent as 'Savings Account' based on the presence of tokens in the interaction, such as but not limited to 'bank', 'account', 'savings', 'balance', 'pin' etc., the approach of extending the probabilistic intent model on top of token vector representations may be analyzing the vector representations of each of the underlying tokens to establish intents within 'savings account', such as 'savings account credential' (consisting of tokens like 'savings', 'account', 'password', 'pin' and a separate one 'savings account transactions' (consisting of tokens like PIN documents having similar context 'savings', 'account', 'balance', 'loans', 'credit', 'debit' etc.).

In another exemplary embodiment, the textual latent value extractor component 110 may work with the obtained text from the audio signals to find the latent contextual target of the user's statement. The model may attempt to determine a context window of the issue and estimate polarity of the statement. The bi-directional LSTM may be configured to scan time points in both forward and reverse time order to gather context and remember previous information to provide insight into the next dialogue. Finally, a simple probability intent model may be used where the intent model may be capable of determining one or more intents, of the end user's conversation with the bot, more precisely using the tokens. Thus, this hybrid model approach may classify the one or more intents more accurately and provide distinguishable insights in business strategy and product development.

Figure 9A:
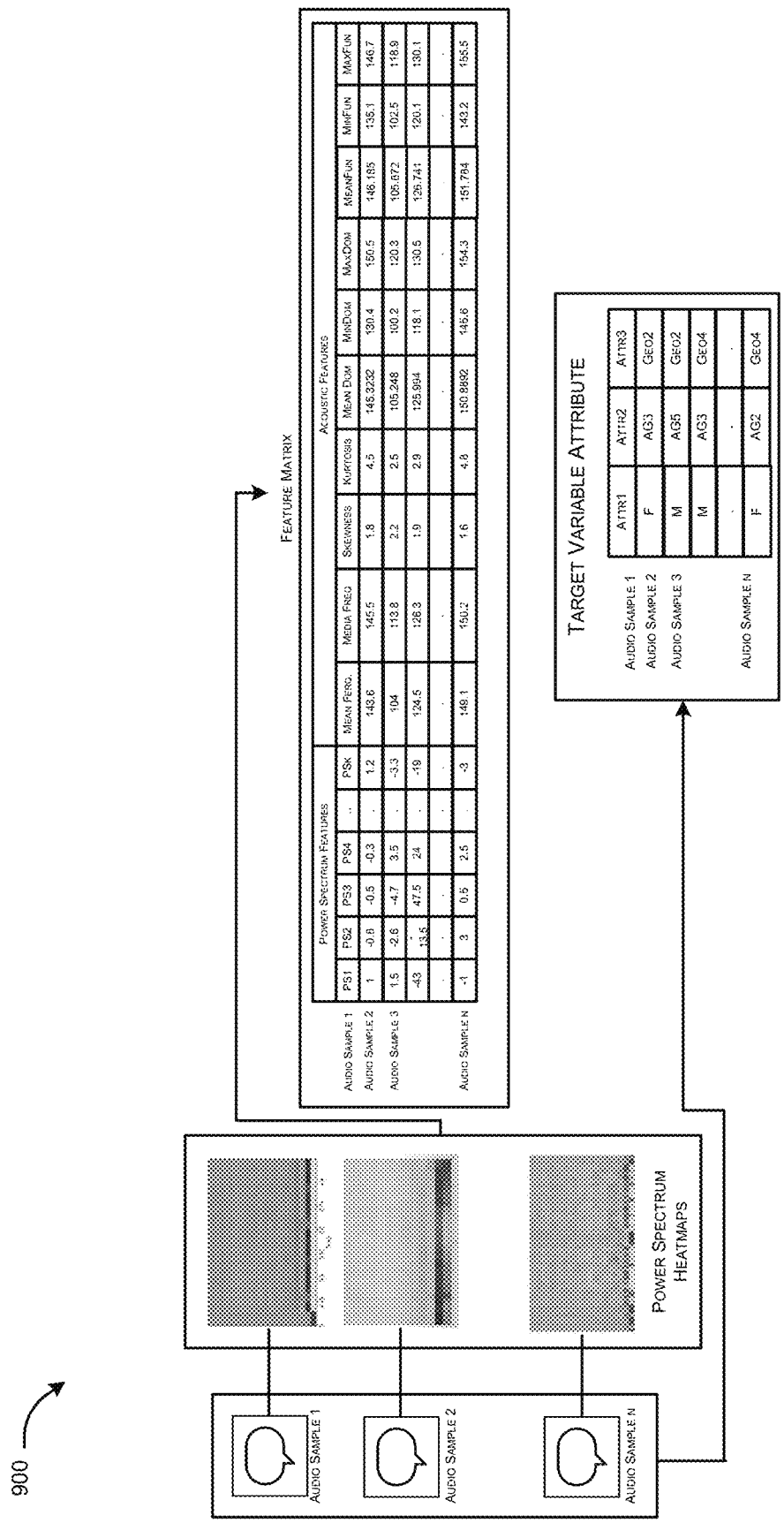
FIGS. 9A-9O illustrate exemplary diagrams depicting the processing performed by the acoustic analytical record engine, the audio signal codification optimizer, and the textual latent value extractor of the system of FIG. 1, according to an embodiment of the present disclosure.

FIGS. 9A-9O illustrate exemplary diagrams to depict the processing performed by the acoustic analytical record engine, the audio signal codification optimizer, and the textual latent value extractor of the system of FIG. 1. In an exemplary embodiment, a use case implementation 900 of the acoustic analytical record engine 106 is illustrated in FIG. 9A. The primary constituting unit of the acoustic analytical record are audio samples of different end users. Each of these audio samples may be correspondingly tagged or categorized to different user attributes depending on business requirement. The power spectrum KPIs and the acoustic KPIs may be processed from the audio samples, thereby creating a feature vector. The feature vector may be a unique machine ingestible signature of the audio sample which may describe the audio sample in a quantifiable manner.

Figure 9B:
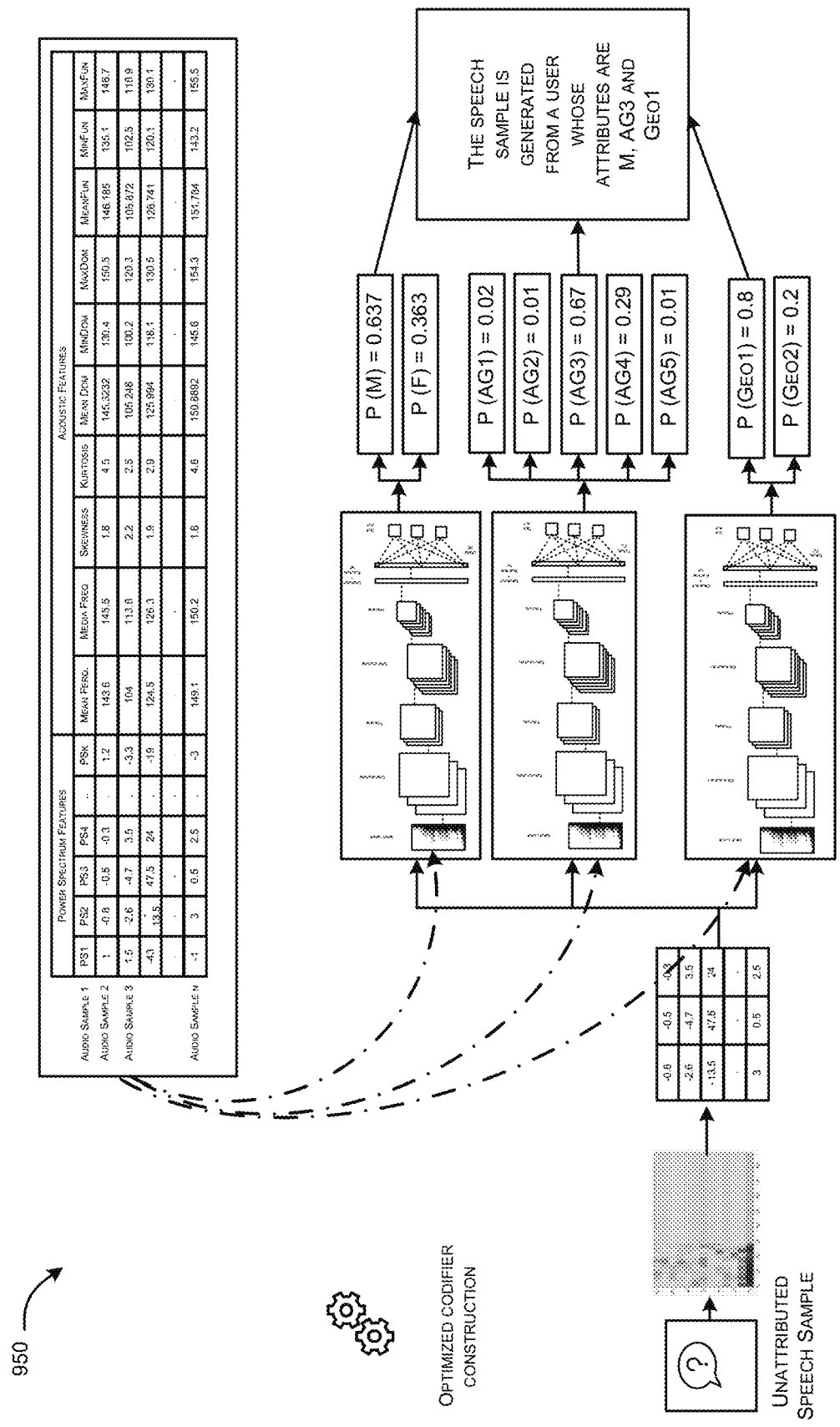
Figure 9C:
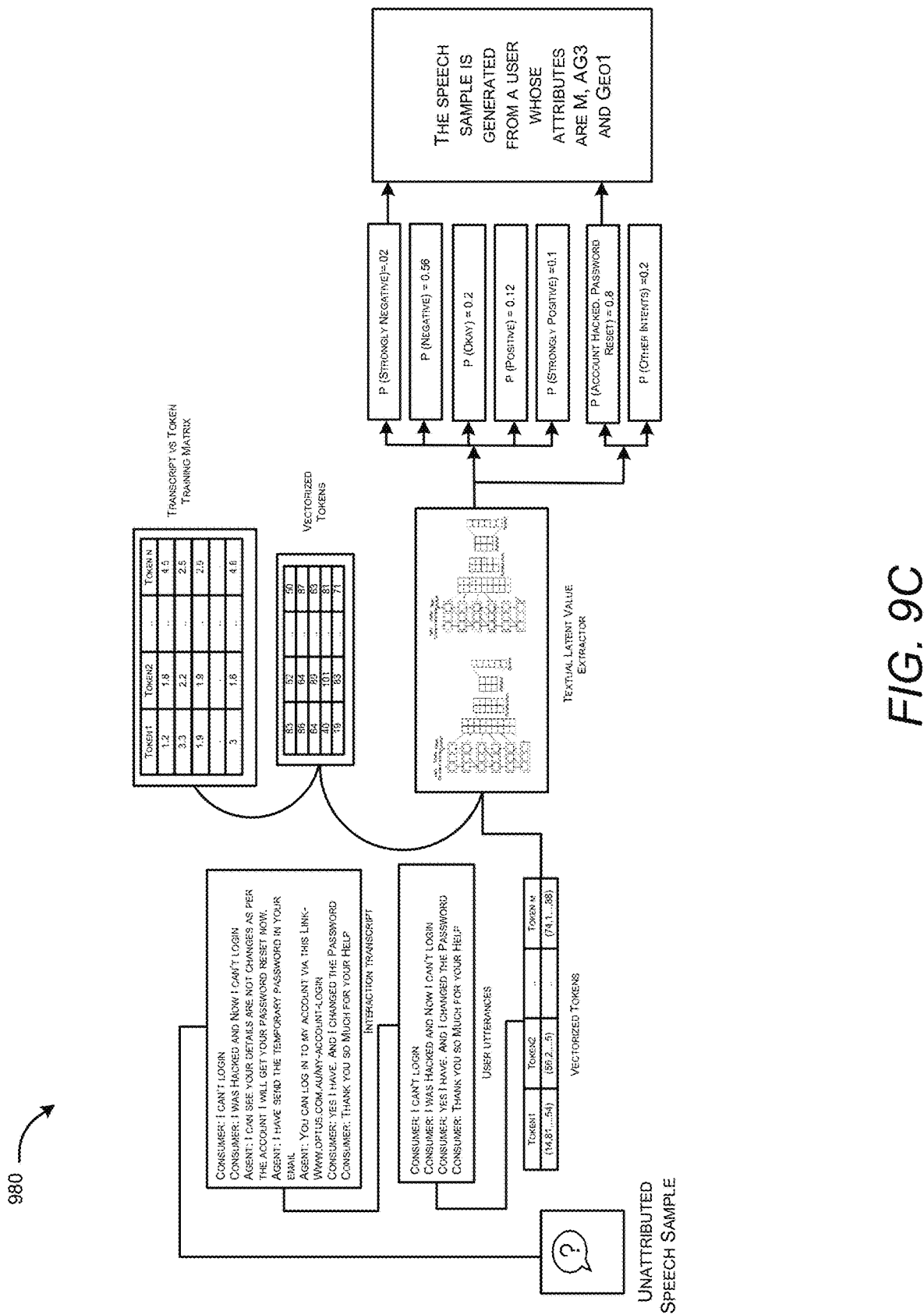

In another exemplary embodiment, a use case implementation 950 of the audio signal codification optimizer 108 is illustrated in FIG. 9B. The feature matrix constructed by the acoustic analytical record engine 106 may be passed to the audio signal codification optimizer 108 for further processing. The neural network architecture, used by the audio signal codification optimizer 108, may be configured to train or optimize a set of weights for different architecture layers. The resultant convolutional neural network model may then be used to estimate probabilities of different target variable categories. In an example, if the business objective requires 'm' different target variable attributions, 'm' different neural network codification models may be constructed. Each model may be used for predicting respective target variable attributes.

In yet another exemplary embodiment, a use case implementation 980 of the textual latent value extractor component 110 is illustrated in FIG. 9O. The textual data extracted from the speech samples in the acoustic analytical record engine 106 may be passed through the textual latent value extractor component 110. Textual data corresponding to one or more sentences uttered by the user/consumer may be extracted and converted to vectorized tokens. The vectorized tokens may be fed to one or more machine learning models where the models may be configured to estimate likelihood of a plurality of categories, such as categories associated with sentence polarity. A machine learning model may be configured for estimating likelihood of a plurality of categories corresponding to only one attribute, such as polarity or intent. The plurality of machine learning models may be used corresponding to a plurality of attributes. Finally, a category from the plurality of categories corresponding to an attribute may be selected if the category is determined to have highest likelihood among the plurality of categories.

Figure 10:
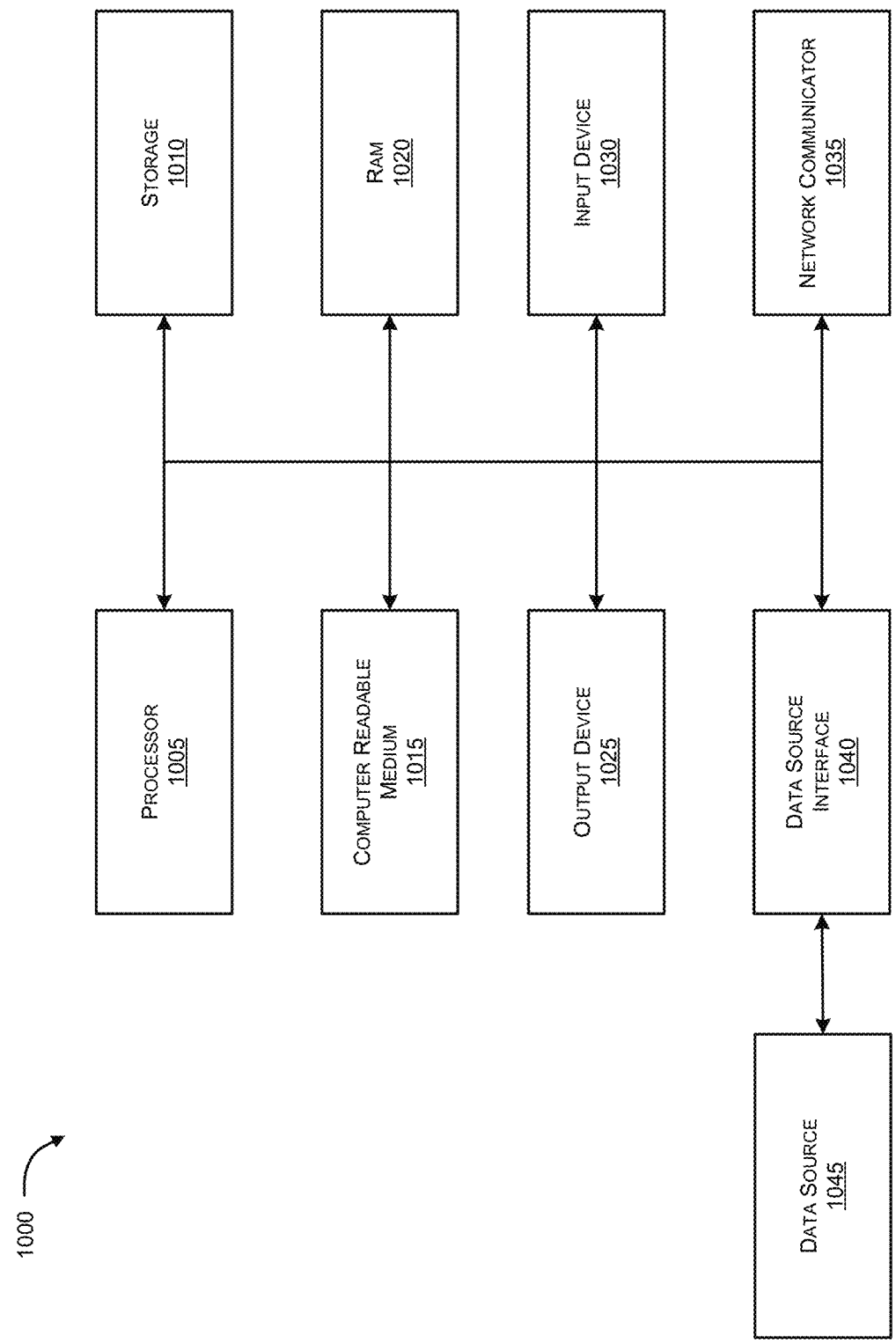
FIG. 10 illustrates a hardware platform for implementation of the disclosed system, according to an embodiment of the present disclosure.

FIG. 10 illustrates a hardware platform 1000 for implementation of the disclosed system. For the sake of brevity, construction and operational features of the system 100 which are explained in detail above are not explained in detail herein. Particularly, computing machines, such as but not limited to internal/external server clusters, quantum computers, desktops, laptops, smartphones, tablets, and wearables which may be used to execute the system 100 or may include the structure of the hardware platform 1000. As illustrated, the hardware platform 1000 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1000 may be a computer system, such as the system 100, that may be used with the embodiments described herein. The computer system may represent a computational platform that includes components that may be in a server or another computer system. The computer system may execute, by the processor 1005 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1005 that executes software instructions or code stored on a non-transitory computer-readable storage medium 1010 to perform methods of the present disclosure. The software code includes, for example, instructions to establishing user persona from audio interactions. In an example, components 104, 106, 108, 110, and/or 112 may be software codes or components performing these steps.

The instructions on the computer-readable storage medium 1010 are read and stored the instructions in storage 1015 or in random access memory (RAM). The storage 1015 may provide a space for keeping static data where at least some instructions could be stored for later execution. The stored instructions may be further compiled to generate other representations of the instructions and dynamically stored in the RAM, such as RAM 1020. The processor 1005 may read instructions from the RAM 1020 and perform actions as instructed.

The computer system may further include the output device 1025 to provide at least some of the results of the execution as output including, but not limited to, visual information to users, such as external agents. The output device 1025 may include a display on computing devices and virtual reality glasses. For example, the display may be a mobile phone screen or a laptop screen. GUIs and/or text may be presented as an output on the display screen. The computer system may further include an input device 1030 to provide a user or another device with mechanisms for entering data and/or otherwise interact with the computer system. The input device 1030 may include, for example, a keyboard, a keypad, a mouse, or a touchscreen. Each of these output devices 1025 and input device 1030 may be joined by one or more additional peripherals. For example, the output device 1025 may be used to display intermediate and/or final results of establishing user persona from audio interactions by the system 100.

A network communicator 1035 may be provided to connect the computer system to a network and in turn to other devices connected to the network including other clients, servers, data stores, and interfaces, for instance. A network communicator 1035 may include, for example, a network adapter, such as a LAN adapter or a wireless adapter. The computer system may include a data sources interface 1040 to access the data source 1045. The data source 1045 may be an information resource. As an example, a database of exceptions and rules may be provided as the data source 1045. Moreover, knowledge repositories and curated data may be other examples of the data source 1045.

FIG. 11 illustrates a method flow diagram for the disclosed method 1100 for establishing user persona from audio interactions. At 1102, the method 1100 may include the step of receiving an audio sample comprising a plurality of audio signals indicative of voice conversation between a user and a bot. At 1104, the method may include the step of transforming the audio signals into quantifiable and machine-ingestible power spectrum indicators and acoustic indicators. The power spectrum indicators and acoustic indicators may uniquely represent the audio sample in the form of a feature vector. At 1106, the method 1100 can include the step of ingesting and processing the power spectrum indicators and the acoustic indicators to estimate likelihood of an attribute value representing the audio sample by constructing a convolutional neural network model for each attribute category. At 1108, the method 1100 can establish user persona attribute values across one or more attribute categories for the received audio sample based on the estimated likelihood. At step 1110 the method 1100 can further determine the issue's context window and estimate the statements polarity to provide distinguishable insight in business strategy and development.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
    a processor;
    a memory coupled to the processor, wherein the memory comprises a computer-readable instructions in form of a voice-based conversational artificial intelligence (AI) platform comprising:
        an acoustic analytical record engine operatively coupled with the processor that causes the engine to:
            receive an audio sample comprising a plurality of audio signals indicative of voice conversation between a user and a bot;
            convert the audio signals into quantifiable and machine-ingestible power spectrum indicators and acoustic indicators that uniquely represent the audio sample, to create a feature vector;
        an audio signal codification optimizer coupled with said processor that causes the optimizer to:
            determine likelihood of an attribute value representing the audio sample based on the power spectrum indicators and the acoustic indicators by generating a convolutional neural network model for each attribute category;
            establish user persona attribute values across one or more attribute categories for the received audio sample based on the estimated likelihood; and
        a textual latent value extractor coupled with said processor that causes the optimizer to:
            generate textual transcript based on the audio sample; and analyze the textual transcript using a hybrid deep learning engine that analyzes textual content in the textual transcript and evaluate interactions in the content to determine associated polarities coupled with latent intents, wherein the textual content in the transcript is analyzed to generate token vector representations that are fed into a bi-directional LSTM neural network to determine the associated polarities; and wherein the user persona attribute values, associated polarities, latent intents, correspond to insights, and wherein the insights are fed back to at least one of the acoustic analytical record engine, the audio signal codification optimizer, and the textual latent value extractor.

2. The system as claimed in claim 1, wherein the user persona attributes are selected from any or a combination of a demographic attribute of the user, gender of the user, age group of the user, and geographic accent of the user.

3. The system as claimed in claim 1, wherein the acoustic analytical record engine is associated with a repository that maintains a record of docketing past audio samples along with mapped user persona attribute values across one or more attribute categories.

4. The system as claimed in claim 1, wherein the power spectrum indicators are determined based on the user's vocal tract.

5. The system as claimed in claim 1, wherein the acoustic indicators are determined based on frequency and amplitude of the audio signals.

6. The system as claimed in claim 1, wherein the feature vector is representative of unique acoustic signature of the user.

7. The system as claimed in claim 1, wherein the audio signals are transformed into the quantifiable and machine-ingestible power spectrum indicators and acoustic indicators based on:
a scaling filter bank having diverging width, wherein output of the filter bank is processed through logarithmic transformation to obtain effective normalization;
a cosine transformation that de-correlates overlapping energies that get captured in the filter bank such that resulting coefficients are used as signature for the respective audio signal.

8. The system as claimed in claim 1, wherein the audio signal codification optimizer performs audio signal pre-processing and feature engineering to undertake codification and optimization of such codification so as to map the received audio sample to the one or more user persona attributes values by estimating scores for different attribute values associated with each attribute category.

9. The system as claimed in claim 8, wherein the codification and optimization is performed by constructing a feedforward artificial neural network for each personal attribute such that the feedforward artificial neural network ingests the power spectrum indicators and the acoustic indicators and optimizes its estimated weights across different layers.

10. The system as claimed in claim 9, wherein the feedforward artificial neural network estimates the scores for the different attribute values and predicts the established user persona attribute values across one or more attribute categories.

11. The system as claimed in claim 9, wherein the feedforward artificial neural network is based on a sequential convolutional neural network (CNN) model that comprises a first convolution layer that receives the power spectrum indicators and the acoustic indicators, a first pooling layer, a second convolution layer, a second pooling layer, a dropout layer, a flattening layer, and a dense layered neural network that estimates the scores for the different attribute values.

12. The system as claimed in claim 11, wherein the kernel size of the first and second convolutional layers, and pool size of first and second pooling layers are configurable.

13. The system as claimed in claim 1, wherein final states of the bi-directional LSTM neural network are merged with a target contextual vector and fed into a second bi-directional review-level LSTM to estimate the associated polarities.

14. The system as claimed in claim 1, wherein the latent intent is estimated based on processing of the token vector representations, concurrent contextual tokens, and associated concurrent probabilistic distributions.

15. A method for establishing user persona from audio interactions, the method comprising:
receiving, by a processor, an audio sample comprising a plurality of audio signals indicative of voice conversation between a user and a bot;
converting, by the processor, the audio signals into quantifiable and machine-ingestible power spectrum indicators and acoustic indicators that uniquely represent the audio sample to create a feature vector;
determining, by the processor, likelihood of an attribute value representing the audio sample based on the power spectrum indicators and the acoustic indicators by generating a convolutional neural network model for each attribute category;
establishing, by the processor, user persona attribute values across one or more attribute categories for the received audio sample based on the estimated likelihood;
generating, by the processor, a textual transcript based on the audio sample; and
analyzing, by the processor, the textual transcript using a hybrid deep learning engine that analyzes textual content in the textual transcript and evaluate interactions in the content to determine associated polarities coupled with latent intents, wherein the textual content in the transcript is analyzed to generate token vector representations that are fed into a bi-directional LSTM neural network to determine the associated polarities; and
wherein the user persona attribute values, associated polarities, latent intents, correspond to insights, and wherein the insights are fed back to at least one of an acoustic analytical record engine, an audio signal codification optimizer, and a textual latent value extractor.

16. A non-transitory computer readable medium, wherein the readable medium comprises machine executable instructions that are executable by a processor to:
receive an audio sample comprising a plurality of audio signals indicative of voice conversation between a user and a bot;
convert the audio signals into quantifiable and machine-ingestible power spectrum indicators and acoustic indicators that uniquely represent the audio sample to create a feature vector;
determine likelihood of an attribute value representing the audio sample based on the power spectrum indicators and the acoustic indicators by generating a convolutional neural network model for each attribute category;

establish user persona attribute values across one or more attribute categories for the received audio sample based on the estimated likelihood;

generate textual transcript based on the audio sample; and analyze the textual transcript using a hybrid deep learning engine that analyzes textual content in the textual transcript and evaluate interactions in the content to determine associated polarities coupled with latent intents, wherein the textual content in the transcript is analyzed to generate token vector representations that are fed into a bi-directional LSTM neural network to determine the associated polarities; and wherein the user persona attribute values, associated polarities, latent intents, correspond to insights, and wherein the insights are fed back to at least one of an acoustic analytical record engine, an audio signal codification optimizer, and a textual latent value extractor.

* * * * *